United States Patent [19]

Sagolili et al.

[11] 4,354,746

[45] Oct. 19, 1982

[54] UNITARY LIGHT SHIELD FOR USE IN COLOR PICTURE TUBE LIGHTHOUSES

[75] Inventors: Emmanuel T. Sagolili, Midland; Glenn E. Hall, Wye Vale, both of Canada

[73] Assignee: RCA Corporation, New York, N.Y.

[21] Appl. No.: 305,081

[22] Filed: Sep. 24, 1981

[51] Int. Cl.[3] .............................................. G03B 41/00

[52] U.S. Cl. ........................................................ 354/1

[58] Field of Search ........................................... 354/1

[56] References Cited

U.S. PATENT DOCUMENTS 3,838,432 9/1974 Park ....................................... 354/1

3,889,329 6/1975 Fazlin ................................ 354/1 X 3,955,094 5/1976 Barczynski et al. ................ 250/527

4,122,461 10/1978 Morean ................................. 354/1

*Primary Examiner*—John Gonzales

*Attorney, Agent, or Firm*—Eugene M. Whitacre; Dennis H. Irlbeck; Lester L. Hallacher

[57] ABSTRACT

A unitary light shield for use with a color picture tube lighthouse has non-reflective sides, the edges of which are curved to conform with the intensity pattern of the exposing lamp. An apertured bottom member also is non-reflective of light. The device substantially reduces the exposure of the sidewalls of the panels by penumbra and scattered light.

10 Claims, 2 Drawing Figures

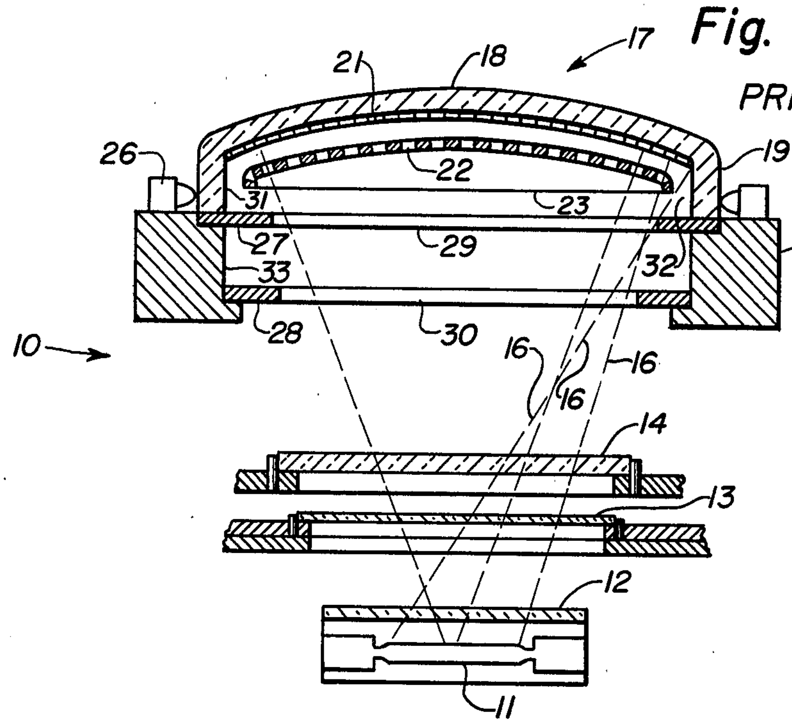
Fig. 1
PRIOR ART
Fig. 2
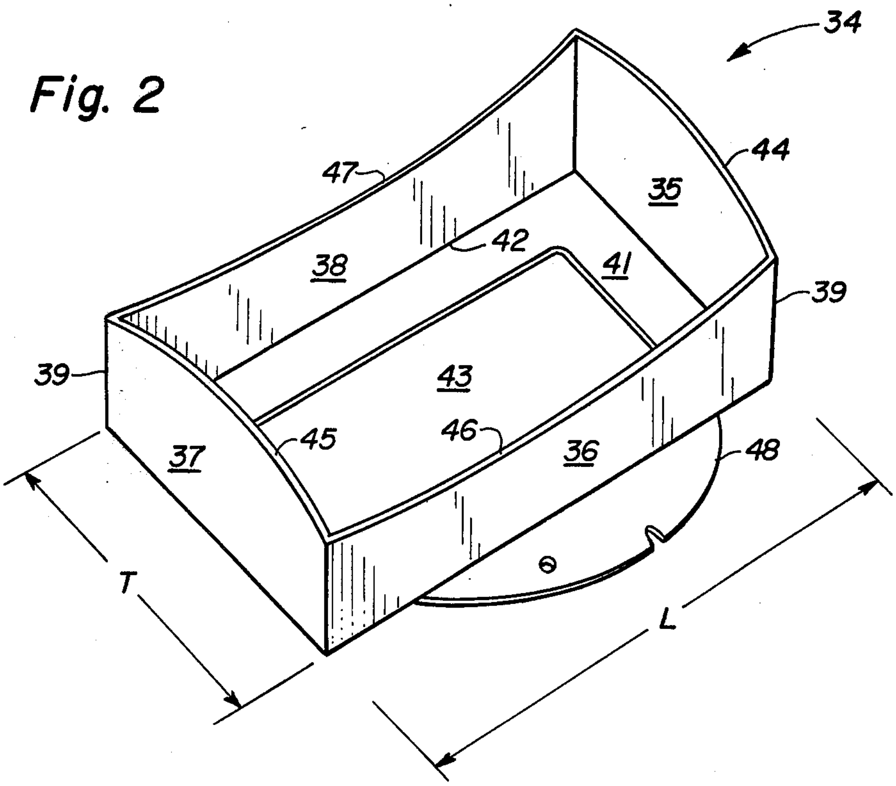

UNITARY LIGHT SHIELD FOR USE IN COLOR PICTURE TUBE LIGHTHOUSES

BACKGROUND OF THE INVENTION

This invention relates generally to the production of phosphor screens for color picture tubes and particularly to a unitary light shield for use in a lighthouse used to produce such screens.

A color picture tube includes a screen composed of triads of different phosphors which emit different colored light when excited by electrons. Typically, the screen is composed of alternating stripes or dots of phosphors which respectively emit red, green and blue light. Positioned between the screen and the electron gun from which the exciting electrons emanate is a color selection electrode, commonly called a shadow mask. The shadow mask assures that the electron beams excite phosphor stripes of the proper color.

During the production of the phosphor screen, the entire inside surface of the panel is coated with a slurry which consists of one of the phosphors mixed in photosensitive material. The shadow mask is then inserted into the panel and the assembly is placed onto a lighthouse which contains a light source. Light from the light source passes through the apertures in the shadow mask and exposes some of the phosphor. The shadow mask is then removed and the unexposed phosphor is washed away leaving only the exposed phosphor. This process is then repeated for the remaining two colors of phosphors.

During the application of the slurry to the inside surface of the panel, the slurry is applied while the panel is rotating to spread the slurry over the entire inside surface. The excess slurry is then poured from the panel and thus some of the slurry adheres to the sidewalls of the panel. During the light exposure process, a plurality of light shields are used in an effort to direct the light only to those portions of the screen where the retention of the phosphor material is desired. However, problems sometimes arise because the penumbra light exposes some of the phosphor material on the sides of the panel irrespective of the presence of the light shield. Accordingly, it ordinarily is necessary to trim the sides of the panels to remove the exposed slurry to avoid difficulties in the operation of the finished tube.

The instant invention overcomes this difficulty by the provision of a unitary light shield which effectively blocks the penumbra light from the panel sidewalls to substantially reduce, or eliminate, exposure of the slurry on the panel sidewalls, thereby substantially reducing the need for trimming exposed phosphors from the sidewalls.

SUMMARY OF THE INVENTION

A unitary light shield for use with a color picture tube lighthouse includes a plurality of light opaque side members arranged to form a polygon. The side members are affixed to one another at light opaque corners. A light opaque bottom member is congruent to the polygon and is affixed to the side members along light opaque seams. The bottom member includes a light transparent aperture which is similar to the polygon and which is centered in the bottom member whereby light can pass through the aperture and the top of the polygon and is blocked by the side members and the bottom member.

BRIEF DESCRIPTION OF THE DRAWINGS

FIG. 1 is a cross-section view, partially broken away, of a standard type of lighthouse including light shields of the type ordinarily used in the art.

FIG. 2 is a perspective view of a preferred embodiment.

DETAILED DESCRIPTION OF THE PREFERRED EMBODIMENT

In FIG. 1, a lighthouse 10 of a type well known in the art includes a light source 11, such as a tubular mercury arc lamp. The lighthouse 10 includes a series of lenses, 12, 13, and 14, which correct the paths the light rays 16 take toward a panel 17 of a color television picture tube. The panel 17 includes a faceplate 18 and sidewalls 19. Arranged on the inside surface of the faceplate 18 is a screen 21 in the form of a slurry composed of a phosphor suspended in a photosensitive material. The screen 21 is exposed to the light rays 16 through apertures 22 in a shadow mask 23. The panel 17 is supported on the lighthouse 10 by a resessed support 24 and is held in a centered position by movable bumpers 26 in known manner. The support 24 also supports light shields 27 and 28 which respectively contain apertures 29 and 30 through which the light rays 16 pass when travelling toward the shadow mask 23 and the screen 21. The apertures 29 and 30 are dimensioned in an effort to prevent the light rays 16 from impinging upon the inside surfaces 31 of the sidewalls 19 of the panel 17. However, difficulties frequently arise because slurry on the inside surfaces 31 of the sidewalls 19 is exposed by penumbra light rays 32. The exposed slurry cannot be washed away in the same manner as unexposed slurry and therefore mechanical trimming is required for removal thereof. Difficulties also arise because the light can be reflected from the sides 33 of the support 24 and scattered in the cavity formed between the light shields 27 and 28 to expose the slurry on the inside surfaces 31 of the panel 17.

The preferred embodiment of a unitary light shield 34 shown in FIG. 2 avoids these difficulties. The unitary light shield 34 is in the form of a polygon, such as a rectangle, having light opaque side members 35, 36, 37, and 38. The side members 35 through 38 can be made either as separate members or from a single formed strip which is connected at one of the corners 39. In either event, the corners 39 are light opaque. A light opaque bottom member 41 is affixed to one edge of the side members 35 through 38 along a light opaque seam 42. Centered in the bottom member 41 is a light transmissive aperture 43 which is similar to the polygon formed by the side members 35 through 38.

In the rectangular preferred embodiment shown, the side members 35 through 38 are substantially planar, or flat, and the edges opposite from the edges to which the bottom member 41 is attached are curved. The edges 44 and 45 of the side members 35 and 37 respectively are curved upwardly away from the bottom member 41. The edges 46 and 47 of the side members 36 and 38 respectively are curved downwardly toward the bottom member 41. The curvature of the side members accomodates the intensity pattern of the lamp 11 to assure uniform exposure of the screen 21 (FIG. 1). The configurations of the edges 44 through 47 are smooth continuous curves which preferably are parabolic or hyperbolic. The deviations of the edges 44 and 45 of the short side members 35 and 37 are equal and extend away from the bottom member 41. The configurations of the edges 44 and 45, therefore are identical. The deviations of the edges 46 and 47 of the long side members 36 and 38 are equal but opposite in direction to the deviation of the edges 44 and 45. The configurations of the edges 46 and 47 are identical. The extent of the deviation of the curved edges 44 through 47 in the preferred embodiment is in the order of approximately 0.25 inches (0.635 centimeters). The longitudinal dimension L and the transverse dimension T of the unitary light shield 34 are determined by the corresponding dimensions of the panel 17 with which the light shield is to be used. Thus, the dimensions L and T of the light shield 34 would be substantially identical to the dimensions of the aperture 29 within the light shield 27 of the prior art device shown in FIG. 1. The L and T dimensions of the aperture 43 within the bottom member 41 are selected to be in the order of about 50 to 60% of the corresponding L and T dimensions of the shield 34.

A flange 48 is permanently affixed to the shield 34 and is used to couple the shield into the lighthouse 10. The side members 35 through 38 and the bottom member 41 are all made to be non-reflective of light and thus, can be made of, for example, black anodized aliminum.

A unitary light shield 34 is advantageous over the prior art light shielding because the curved edges of the side members permit substantially uniform exposure of the phosphor screen 24 to the light in accordance with the intensity pattern of the light from lamp 11. Additionally, the side members 35 through 38 close off the cavity formed between the light shields 27 and 28 (FIG. 1) of the prior devices thereby substantially decreasing or eliminating reflected and scattered light which otherwise could expose excess slurry on the inside sidewalls 31 of the panel 17. Another advantage of the inventive device stems from the fact that the closing effect gained from the sidewalls 35 through 38 prevents dried excess slurry from dropping onto the lenses 14 of the lighthouse. Additionally because the inventive device sits down into the cavity of the lighthouse the task of loading and unloading panels from the lighthouse is somewhat easier.

What is claimed is:

1. A unitary light shield for use with a color picture tube lighthouse comprising a plurality of substantially planar light opaque side members having one curved edge arranged to form a polygon and affixed to one another at light opaque corners; a light opaque bottom member having a configuration congruent to said polygon and affixed to the edge of said side members opposite said curved edge along light opaque seams, said bottom member including a light transparent aperture similar to said polygon and centered in said bottom whereby light can pass through said aperture and the top of said polygon and is blocked by said side members and said bottom member.

2. The shield of claim 1 wherein said polygon has four of said side members arranged at substantially right angles.

3. The shield of claim 2 wherein said polygon is a rectangle.

4. The shield of claim 1 wherein one half of said side members curve toward said bottom member and the other half of said side members curve away from said bottom member.

5. The shield of claim 4 wherein the linear deviation of said one half of said side members is equal but opposite to the linear deviation of said other half of said side members.

6. The shield of claim 1 wherein said side members and said bottom member are nonreflective of light.

7. The shield of claim 3 wherein the short side members of said rectangle curve away from said bottom member and the long side members curve toward said bottom member.

8. The shield of claim 7 wherein the linear deviation of the curve of all said side members is substantially equal.

9. The shield of claim 6 wherein said side members and said bottom member are nonreflective of light.

10. In a photo exposure device for exposing specific portions of a photosensitive coating of an inner surface of a faceplate panel of a color picture tube, said panel having an apertured mask attached thereto spaced from said photosensitive coating, said device including a light source directing light rays from said source through said mask to said photosensitive coating, said device also including a light shield located between said light source and said panel, the improvement comprising:

said light shield being formed by four sides connected in a rectangular box-like configuration that extend parallel to a central light ray and an edge of each of said sides being curved.

* * * * *